(12) United States Patent
Li

(10) Patent No.: US 12,443,241 B2
(45) Date of Patent: Oct. 14, 2025

(54) ELECTRONIC DEVICE PROTECTIVE CASE AND ELECTRONIC DEVICE ASSEMBLY

(71) Applicant: HONOR DEVICE CO., LTD., Shenzhen (CN)

(72) Inventor: Kuang Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/249,357

(22) PCT Filed: Aug. 17, 2022

(86) PCT No.: PCT/CN2022/113088
§ 371 (c)(1),
(2) Date: Apr. 17, 2023

(87) PCT Pub. No.: WO2023/109159
PCT Pub. Date: Jun. 22, 2023

(65) Prior Publication Data
US 2025/0085747 A1 Mar. 13, 2025

(30) Foreign Application Priority Data
Dec. 14, 2021 (CN) .......................... 202111525390.0

(51) Int. Cl.
*G06F 1/16* (2006.01)
(52) U.S. Cl.
CPC .......... *G06F 1/1656* (2013.01); *G06F 1/1632* (2013.01); *G06F 1/1669* (2013.01)
(58) Field of Classification Search
CPC .... G06F 1/1656; G06F 1/1632; G06F 1/1669; G06F 1/1654
See application file for complete search history.

(56) References Cited

U.S. PATENT DOCUMENTS 9,429,986 B2    8/2016    Xia et al.
12,055,265 B2 *   8/2024    Tucker ................ F16M 13/022
(Continued)

FOREIGN PATENT DOCUMENTS

CN    203386116 U    1/2014
CN    103677111 A    3/2014
(Continued)

OTHER PUBLICATIONS

Machine translation of CN113124278A (Year: 2021).*

*Primary Examiner* — Allen L Parker
*Assistant Examiner* — Peter Krim
(74) *Attorney, Agent, or Firm* — Fish & Richardson P.C.

(57) ABSTRACT

An embodiment of this application provides an electronic device protective case and an electronic device assembly. In the electronic device protective case, one end of a supporting assembly is rotatably connected to a keyboard assembly, the other end of the supporting assembly is rotatably connected to a first connecting member, the first connecting member is slidably connected to a first fastening member, and one surface that is of the first fastening member and that is away from the first connecting member is fixedly connected to the electronic device. Therefore, an adjustment of a random support angle of the electronic device is implemented, so that a use requirement of the user in more application scenarios can be met, thereby improving use performance of the electronic device.

20 Claims, 12 Drawing Sheets

(56) References Cited

U.S. PATENT DOCUMENTS

| | | | |
|---|---|---|---|
| 2004/0001047 A1* | 1/2004 | Wang .................... | G06F 1/1632 |
| | | | 345/168 |
| 2013/0128443 A1 | 5/2013 | Tseng et al. | |
| 2014/0029189 A1* | 1/2014 | Chang ................... | G06F 1/1615 |
| | | | 361/679.11 |
| 2014/0299740 A1 | 10/2014 | Peng et al. | |
| 2014/0340829 A1* | 11/2014 | Matsumoto ........... | G06F 1/1654 |
| | | | 361/679.27 |
| 2015/0286248 A1 | 10/2015 | Sony et al. | |
| 2016/0196936 A1 | 7/2016 | Ding et al. | |
| 2017/0068282 A1* | 3/2017 | Smith ................... | G06F 1/1669 |
| 2017/0075383 A1 | 3/2017 | Park et al. | |
| 2017/0075387 A1* | 3/2017 | Hou ...................... | G06F 1/1639 |
| 2022/0091640 A1* | 3/2022 | Vassberg ................ | A45C 11/00 |
| 2022/0244757 A1 | 8/2022 | Liao et al. | |
| 2022/0244759 A1* | 8/2022 | Liao ...................... | G06F 3/0208 |
| 2023/0195244 A1 | 6/2023 | Xi et al. | |

FOREIGN PATENT DOCUMENTS

| | | | | |
|---|---|---|---|---|
| CN | 103677280 A | | 3/2014 | |
| CN | 211375482 U | | 8/2020 | |
| CN | 212298388 U | | 1/2021 | |
| CN | 112578854 A | | 3/2021 | |
| CN | 113124278 A | * | 7/2021 | ........... F16M 11/043 |
| CN | 213659288 U | | 7/2021 | |
| CN | 113268148 A | | 8/2021 | |
| TW | M610078 U | | 4/2021 | |
| TW | M610079 U | | 4/2021 | |
| WO | 2014031135 A1 | | 2/2014 | |

\* cited by examiner

ELECTRONIC DEVICE PROTECTIVE CASE AND ELECTRONIC DEVICE ASSEMBLY

CROSS-REFERENCE TO RELATED APPLICATIONS

This application is a national stage of International Application No. PCT/CN2022/113088, filed on Aug. 17, 2022, which claims priority to Chinese Patent Application No. 202111525390.0, filed on Dec. 14, 2021. The disclosures of both of the aforementioned applications are hereby incorporated by reference in their entireties.

TECHNICAL FIELD

Embodiments of this application relate to the field of terminal technologies, and in particular, to an electronic device protective case and an electronic device assembly.

BACKGROUND

Currently, electronic devices such as computers and mobile phones are inseparable from our lives, are seen everywhere in our lives, and greatly improve living standards of people. Among them, a portable tablet computer is convenient and efficient, has a powerful function, and integrates functions of amusement and work, and therefore is favored by many users.

To improve input convenience of the tablet computer, currently, a keyboard has emerged for cooperating with the tablet computer, such as a Bluetooth keyboard. A currently common Bluetooth keyboard generally includes a keyboard portion and a protective case, where the keyboard portion is disposed on one side of the protective case, and the tablet computer is fastened on the other side of the protective case. Further, the keyboard portion is provided with a fastening groove for upright positioning the tablet computer, and the fastening groove matches and is clamped with a side end of the tablet computer, so that the tablet computer can be upright relative to the keyboard portion at a specific angle.

However, the current Bluetooth keyboard can only support the tablet computer at a fixed angle, resulting in inconvenient use by the user.

SUMMARY

An embodiment of this application provides an electronic device protective case and an electronic device assembly, to implement an adjustment of a random support angle of an electronic device, so that a use requirement of a user in more application scenarios can be met, thereby improving use performance of the electronic device.

According to a first aspect, an embodiment of this application provides an electronic device protective case, and the electronic device protective case includes at least: a keyboard assembly and a protective case, where the protective case includes a supporting assembly, a first connecting member, and a first fastening member; one end of the supporting assembly is rotatably connected to the keyboard assembly, the other end of the supporting assembly is rotatably connected to the first connecting member, and the first connecting member is further slidably connected to the first fastening member; and a surface that is of the first fastening member and that is away from the first connecting member is fixedly connected to an electronic device.

According to the electronic device protective case provided in this embodiment of this application, one end of the supporting assembly is rotatably connected to the keyboard assembly, the other end of the supporting assembly is rotatably connected to the first connecting member, the first connecting member is slidably connected to the first fastening member, and the surface that is of the first fastening member and that is away from the first connecting member is fixedly connected to the electronic device. In actual use, one hand of a user presses and holds the keyboard assembly, and the other hand moves the electronic device, so that a support angle of the electronic device can be flexibly adjusted in a process of opening or closing. Therefore, in this embodiment of this application, an adjustment of a random support angle of the electronic device is implemented, so that a use requirement of the user in more application scenarios can be met, thereby improving use performance of the electronic device.

In a possible implementation, the supporting assembly includes: a support member and a second connecting member fixedly connected to the support member; and the second connecting member is rotatably connected to the keyboard assembly, and the support member is rotatably connected to the first connecting member.

In a possible implementation, the second connecting member includes: a first connecting portion and a second connecting portion fixedly connected to the first connecting portion; and the first connecting portion is rotatably connected to the keyboard assembly, and the second connecting portion is fixedly connected to the support member.

In a possible implementation, the keyboard assembly includes: a keyboard body and a third connecting portion connected to the keyboard body; a first mounting hole is disposed on the third connecting portion; and the first connecting portion includes: a body portion and a first rotating shaft fixedly connected to the body portion, where the first rotating shaft is located in the first mounting hole, and the first rotating shaft and the first mounting hole rotatably match each other. The first rotating shaft on the first connecting portion and the first mounting hole on the third connecting portion rotatably match each other, so that the first connecting portion can be rotatably connected to the third connecting portion, and the second connecting member can be rotatably connected to the keyboard assembly.

In a possible implementation, the first rotating shaft includes: a first rotating shaft portion and a second rotating shaft portion fixedly connected to the first rotating shaft portion; a diameter of the second rotating shaft portion is greater than a diameter of the first rotating shaft portion; one end that is of the second rotating shaft portion and that is away from the first rotating shaft portion is fixedly connected to the body portion; the first mounting hole includes: a first sub-mounting hole and a second sub-mounting hole connected to the first sub-mounting hole; an inner diameter of the second sub-mounting hole is greater than an inner diameter of the first sub-mounting hole; and the first rotating shaft portion matches the first sub-mounting hole, and the second rotating shaft portion matches the second sub-mounting hole.

The first rotating shaft is designed as the first rotating shaft portion and the second rotating shaft portion that are connected to each other and that are of different diameters, and the first mounting hole is designed as the first sub-mounting hole and the second sub-mounting hole that are connected to each other and that are of different inner diameters. The first rotating shaft portion with a smaller diameter matches the first sub-mounting hole with a smaller inner diameter, and the second rotating shaft portion with a larger diameter matches the second sub-mounting hole with a larger inner diameter, so that rotation performance between the second connecting member and the keyboard assembly can be improved.

In a possible implementation, a first step surface is formed between the first sub-mounting hole and the second sub-mounting hole; at least one protrusion is disposed on one of the first step surface and an end surface of an end that is of the second rotating shaft portion and that faces the first rotating shaft portion, and at least one recessed portion is disposed on the other of the first step surface and the end surface of the end that is of the second rotating shaft portion and that faces the first rotating shaft portion; and when the protrusion matches the recessed portion, the first step surface fits the end surface of the end that is of the second rotating shaft portion and that faces the first rotating shaft portion.

When the first rotating shaft portion and the first sub-mounting hole rotatably match each other, and the second rotating shaft portion and the second sub-mounting hole rotatably match each other, the first step surface between the first sub-mounting hole and the second sub-mounting hole fits the end surface of the end that is of the second rotating shaft portion and that faces the first rotating shaft portion, at least one protrusion or at least one recessed portion is disposed on the first step surface, and at least one recessed portion or at least one protrusion is disposed on the end surface of the end that is of the second rotating shaft portion and that faces the first rotating shaft portion, so that the protrusion matches the recessed portion, to provide damping for rotation between the second connecting member and the keyboard assembly.

In a possible implementation, the protective case further includes a compression spring; and one end of the compression spring is fixedly connected to the body portion, and the other end of the compression spring is fixedly connected to the second rotating shaft portion. When the first rotating shaft and the first mounting hole implement torque change through matching between the protrusion and the recessed portion during relative rotation, the compression spring can provide a variable torsion force action for matching rotation between the first rotating shaft and the first mounting hole.

In a possible implementation, the support member is detachably connected to the second connecting member. Therefore, when the keyboard assembly is required, the support member is connected to the second connecting member, and the second connecting member is rotatably connected to the keyboard assembly, so that matching between the electronic device and the keyboard assembly and a supporting action are implemented. When the keyboard assembly is not required, the support member and the second connecting member are detached and separated from each other. A matching relationship between the support member, the first connecting member, and the first fastening member is adjusted, to implement an adjustment of a random support angle of the electronic device.

In a possible implementation, the support member includes at least one first contact, and the second connecting member includes at least one second contact; and the first contact is electrically connected to the second contact. The at least one first contact on the support member is electrically connected to the at least one second contact on the second connecting member, so that signal transmission between the support member and the second connecting member may be implemented. In this way, when the support member is connected to the second connecting member, signal transmission between the keyboard assembly and the electronic device can be easily implemented; and when the support member is detached and separated from the second connecting member, signal transmission between the keyboard assembly and the electronic device can be cut off with separation between the first contact and the second contact.

In a possible implementation, the second connecting member further includes an extending portion; a first groove is provided on one end that is of the support member and that is close to the second connecting member; one end of the extending portion is connected to the second connecting portion, the other end of the extending portion extends into the first groove, and the extending portion is detachably connected to the first groove; and the first contact is located in the first groove, and the second contact is located on the extending portion.

The extending portion of the second connecting member extends into the first groove of the support member, so that stability of a connection between the second connecting member and the support member can be improved. In addition, the extending portion is detachably connected to the first groove, so that the support member can be detachably connected to the second connecting member. The first contact is located in the first groove, and the second contact is located on the extending portion, so that the extending portion extends into the first groove, and the first contact is electrically connected to the second contact.

In a possible implementation, at least one protruding portion is disposed on one of an outer side wall of the extending portion and an inner side wall of the first groove, and at least one second groove is disposed on the other of the outer side wall of the extending portion and the inner side wall of the first groove; and the protruding portion matches the second groove.

The at least one protruding portion or the at least one second groove is disposed on the outer side wall of the extending portion, and the at least one second groove or the at least one protruding portion is disposed on the inner side wall of the first groove, when the extending portion extends into the first groove, the outer side wall of the extending portion comes into contact with the inner side wall of the first groove; and in this case, the protruding portion extends into the second groove, and the protruding portion extends into the second groove and matches the second groove, thereby avoiding separation of the extending portion from the first groove, and improving reliability of a connection between the extending portion and the first groove.

In a possible implementation, one of the extending portion and the first groove has a magnetic adsorption force; and at least a part of the extending portion extends into the first groove, and adsorbs an inner wall of the first groove. In this way, the extending portion can be adsorbably connected to the first groove, thereby avoiding separation of the extending portion from the first groove, and improving reliability of a connection between the extending portion and the first groove.

In a possible implementation, one end that is of the support member and that is close to the first connecting member is provided with a second rotating shaft, and one end that is of the first connecting member and that is close to the support member is provided with a second fastening member; or one end that is of the support member and that is close to the first connecting member is provided with a second fastening member, and one end that is of the first connecting member and that is close to the support member is provided with a second rotating shaft; and a second mounting hole is disposed on the second fastening member, the second rotating shaft is located in the second mounting hole, and the second rotating shaft and the second mounting hole rotatably match each other. The second rotating shaft and the second mounting hole rotatably match each other, that is, the support member is rotatably connected to the first connecting member.

In a possible implementation, the first fastening member includes: a first part and a second part fixedly connected to the first part; a slider is disposed on one of the second part and the first connecting member, and a slide rail is disposed on the other of the second part and the first connecting member; and the slider and the slide rail slidably match each other. The slider and the slide rail slidably match each other, that is, the first connecting member is slidably connected to the first fastening member is implemented.

In a possible implementation, the keyboard assembly further includes a fourth connecting portion; the fourth connecting portion is located between the keyboard body and the third connecting portion, and the fourth connecting portion is fixedly connected to each of the keyboard body and the third connecting portion; and an accommodating groove is disposed on the fourth connecting portion, a bottom end of the electronic device is located in the accommodating groove, and the bottom end of the electronic device and the accommodating groove rotatably match each other.

The accommodating groove is disposed on the fourth connecting portion of the keyboard assembly, and the bottom end of the electronic device is located in the accommodating groove, and the bottom end of the electronic device and the accommodating groove rotatably match each other, so that the electronic device can be supported by the keyboard assembly while the bottom end of the electronic device relatively rotates in the accommodating groove, so as to implement an adjustment of a random support angle of the electronic device.

In a possible implementation, at least one of the bottom end of the electronic device and the accommodating groove has a magnetic adsorption force; and the bottom end of the electronic device rotates in the accommodating groove, and adsorbs a bottom wall of the accommodating groove. In this way, the bottom end of the electronic device can be adsorbably connected to the accommodating groove, thereby avoiding separation of the bottom end of the electronic device from the accommodating groove, and improving reliability of a connection between the bottom end of the electronic device and the accommodating groove.

In a possible implementation, the accommodating groove is a circular arc groove; and the electronic device includes: an electronic device body and a circular arc portion fixedly connected to the electronic device body, and the circular arc portion matches the circular arc groove.

The accommodating groove is designed as a circular arc groove, and the bottom end of the electronic device is designed as the circular arc portion that is in a circular arc shape. When the circular arc portion matches the circular arc groove, rotation smoothness between the circular arc portion and the circular arc groove can be improved, thereby improving smoothness when the bottom end of the electronic device and the accommodating groove rotatably match each other.

In a possible implementation, a magnetic member is disposed on at least one of the circular arc portion and the circular arc groove, and a central axis of the magnetic member does not coincide with each of a central axis of the circular arc portion and a central axis of the circular arc groove.

The central axis of the magnetic member does not coincide with each of the central axis of the circular arc portion and the central axis of the circular arc groove, thereby ensuring that the magnetic member is a bias magnetic member relative to the circular arc portion and the circular arc groove. In this case, when the circular arc portion relatively rotates in the circular arc groove, a magnetic adsorption force between the circular arc portion and the circular arc groove may be gradually increased in a process of opening the electronic device relative to the keyboard assembly, and may be gradually decreased in a process of closing the electronic device relative to the keyboard assembly, so as to adapt to an actual application needs when the electronic device is opened or closed relative to the keyboard assembly.

According to a second aspect, an embodiment of this application provides an electronic device assembly, and the electronic device assembly includes at least: an electronic device and any one of the foregoing electronic device protective cases; and a first fastening member of the electronic device protective case is fixedly connected to the electronic device.

According to the electronic device assembly provided in this embodiment of this application, the electronic device assembly includes the electronic device protective case. In the electronic device protective case, one end of a supporting assembly is rotatably connected to a keyboard assembly, the other end of the supporting assembly is rotatably connected to a first connecting member, the first connecting member is slidably connected to a first fastening member, and a surface that is of the first fastening member and that is away from the first connecting member is fixedly connected to the electronic device. In actual use, one hand of a user presses and holds the keyboard assembly, and the other hand moves the electronic device, so that a support angle of the electronic device can be flexibly adjusted in a process of opening or closing. Therefore, in this embodiment of this application, an adjustment of a random support angle of the electronic device is implemented, so that a use requirement of the user in more application scenarios can be met, thereby improving use performance of the electronic device.

In a possible implementation, an opening is provided on a first part of the first fastening member, and the opening is opposite to a camera of the electronic device. The opening on the first fastening member is opposite to the camera of the electronic device, so that the camera of the electronic device can be exposed, so as to ensure normal operation and shooting performance of the camera.

DESCRIPTION OF REFERENCE NUMERALS

300: Electronic device protective case; 100: Keyboard assembly; 110: Keyboard body;
120: Third connecting portion; 121: First mounting hole; 1211: First sub-mounting hole;
1212: Second sub-mounting hole; 1213: First step surface; 1214: Protrusion;
1215: Recessed portion; 130: Fourth connecting portion; 131: Accommodating groove;
200: Protective case; 210: Supporting assembly; 211: Support member;
2112: First groove; 2114: Second groove; 2115: First rotating member;
212: Second connecting member; 2121: First connecting portion; 2123: Body portion;
2124: First rotating shaft; 2125: Second step surface; 2124A: First rotating shaft portion;
2124B: Second rotating shaft portion; 2122: Second connecting portion; 2126: Second contact;
2127: Extending portion; 220: First connecting member; 221: Second rotating member;
230: First fastening member; 231: First part; 2311: Opening;
232: Second part; 2321: Slider; 2322: Slide rail;
240: Compression spring; 250: Magnetic member; 400: Electronic device;
410: Electronic device body; 420: Circular arc portion; 500: Electronic device assembly; and
L1: Central axis.

DESCRIPTION OF EMBODIMENTS

Terms used in implementations of this application are only used to explain specific embodiments of this application, and are not intended to limit this application. The following clearly describes implementations in embodiments of this application with reference to accompanying drawings.

Figure 1:
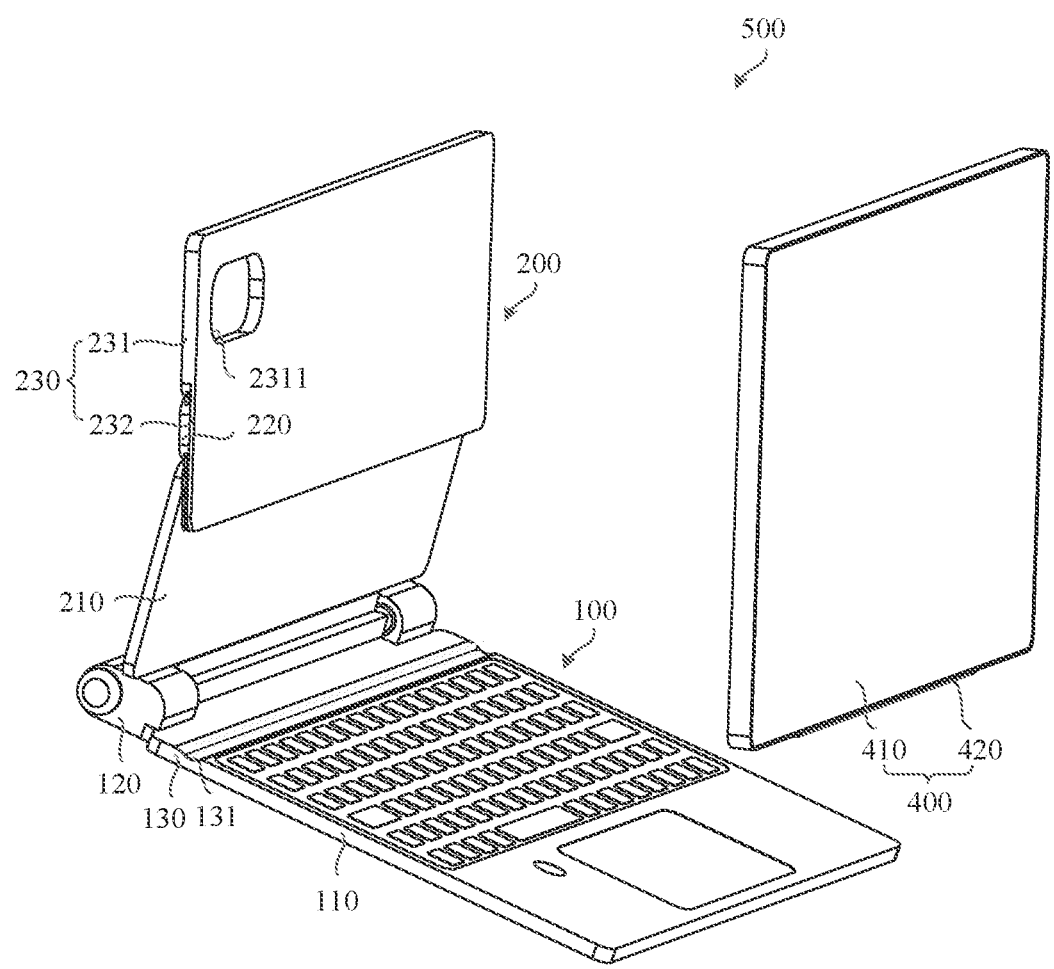
FIG. 1 is a schematic diagram of a structure of an electronic device assembly according to an embodiment of this application.
Figure 2:
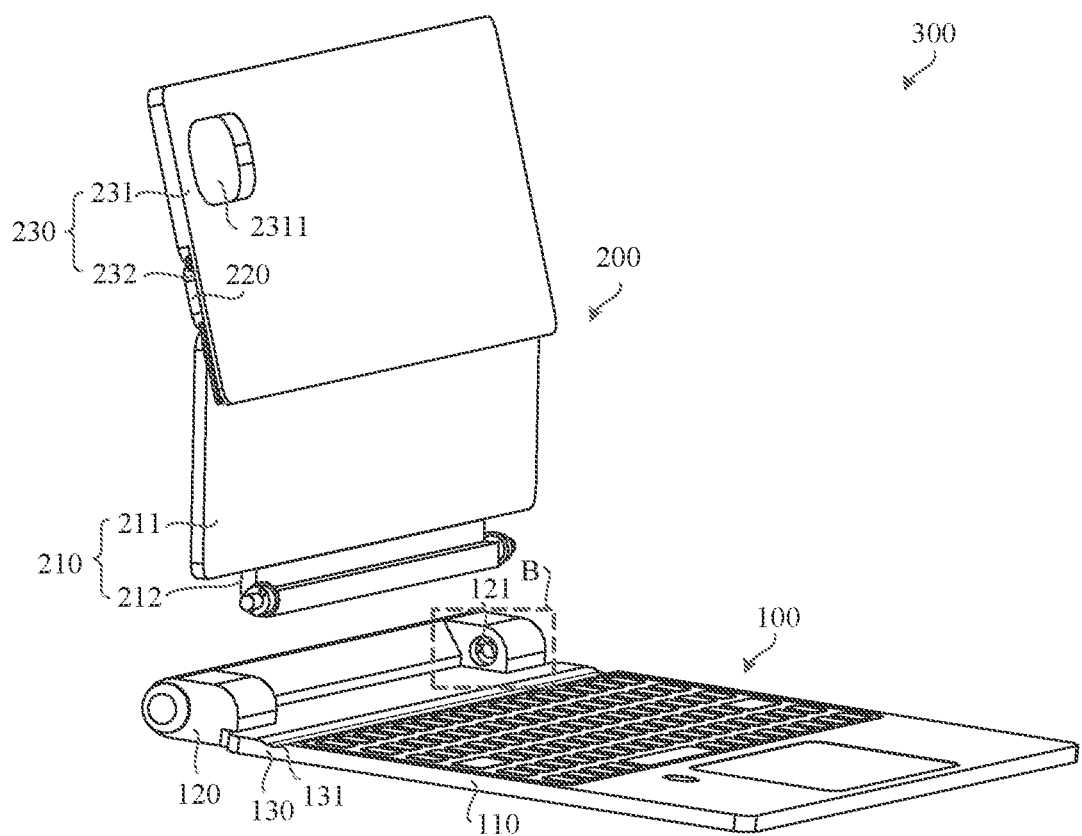
FIG. 2 is a schematic diagram of an overall structure of an electronic device protective case according to an embodiment of this application.

An embodiment of this application provides an electronic device assembly 500. As shown in FIG. 1 and FIG. 2, the electronic device assembly 500 may include an electronic device 400 and an electronic device protective case 300, where the electronic device protective case 300 is configured to protect or support the electronic device 400. Specifically, the electronic device protective case 300 can prevent the electronic device 400 from being scratched and serve as a bracket to support the electronic device 400. In addition, the electronic device 400 can be enabled to enter an operating state or a dormant state by opening or closing the electronic device protective case 300.

It should be noted that the electronic device 400 may include, but is not limited to, a mobile or fixed terminal such as a mobile phone, a tablet computer, a notebook computer, an ultra-mobile personal computer (ultra-mobile personal computer, UMPC), a handheld computer, a walkie-talkie, a netbook, a point of sales (Point of sales, POS), a personal digital assistant (personal digital assistant, PDA) terminal, a wearable device, a virtual reality device, a wireless USB flash drive, a Bluetooth sounder/headset, a factory-installed vehicle component, an event data recorder, a security device, or the like.

The electronic device protective case 300 may include: a keyboard assembly 100 and a protective case 200 matching the keyboard assembly 100, where the keyboard assembly 100 may provide an input to the electronic device 400, and the electronic device 400 performs, based on the keyboard assembly 100, an operation in response to the input. In a related technology, the keyboard assembly 100 is disposed on one side of the protective case 200, and the electronic device 400 is fastened on the other side of the protective case 200. Further, the keyboard assembly 100 is provided with a fastening groove for upright positioning the electronic device 400, and the fastening groove matches and is clamped with a side end of the electronic device 400, so that the electronic device 400 can be upright relative to the keyboard assembly 100 at a specific angle. However, in this way, when the protective case 200 supports the electronic device 400, only single-angle supporting can be performed, and an adjustment of a random support angle cannot be implemented, and consequently a use requirement of a user in more application scenarios cannot be met.

Based on this, an embodiment of this application provides an electronic device protective case 300, one end of a supporting assembly is rotatably connected to a keyboard assembly 100, the other end of the supporting assembly is rotatably connected to a first connecting member, the first connecting member is slidably connected to a first fastening member, and one surface that is of the first fastening member and that is away from the first connecting member is fixedly connected to an electronic device 400. In actual use, one hand of a user presses and holds the keyboard assembly 100, and the other hand moves the electronic device 400, so that a support angle of the electronic device 400 can be flexibly adjusted in a process of opening or closing. Therefore, in this embodiment of this application, an adjustment of a random support angle of the electronic device 400 is implemented, so that a use requirement of the user in more application scenarios can be met, thereby improving use performance of the electronic device 400.

The following uses a specific embodiment as an example, to describe a specific structure of an electronic device protective case 300 in detail with reference to accompanying drawings.

It should be noted that, in this embodiment of this application, that a tablet computer is an electronic device 400 is used as an example for description.

As shown in FIG. 1 and FIG. 2, an embodiment of this application provides an electronic device protective case 300. The electronic device protective case 300 may include at least: a keyboard assembly 100 and a protective case 200. The protective case 200 may include: a supporting assembly 210, a first connecting member 220, and a first fastening member 230, where one end of the supporting assembly 210 is rotatably connected to the keyboard assembly 100, the other end of the supporting assembly 210 is rotatably connected to the first connecting member 220. The first connecting member 220 is further slidably connected to the first fastening member 230, and one surface that is of the first fastening member 230 and that is away from the first connecting member 220 is fixedly connected to the electronic device 400.

Figure 3:
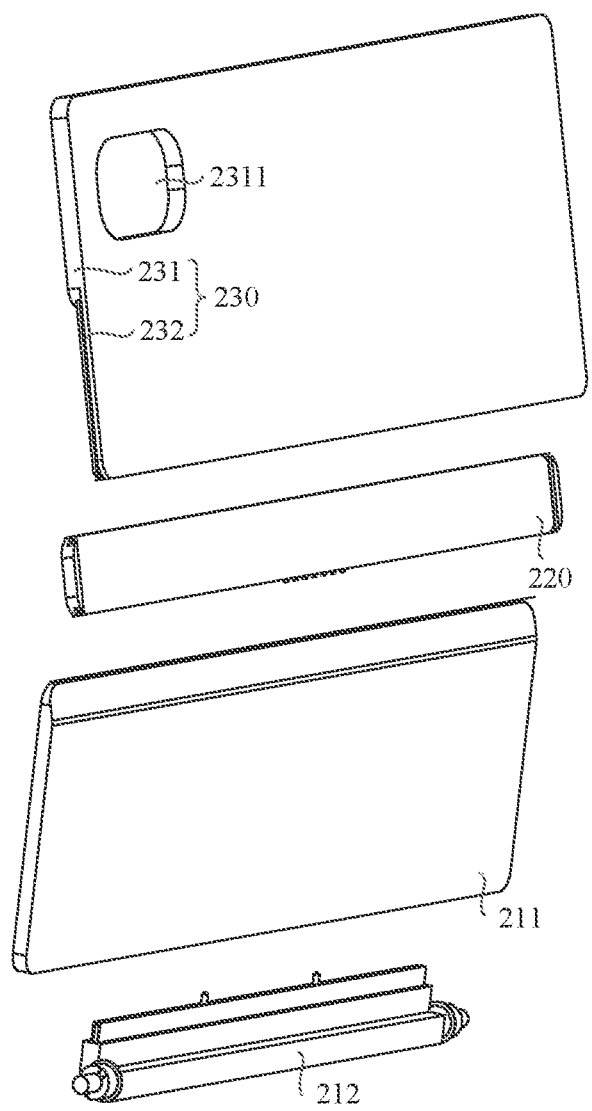
FIG. 3 is a schematic diagram of a split structure of an electronic device protective case according to an embodiment of this application.
Figure 4:
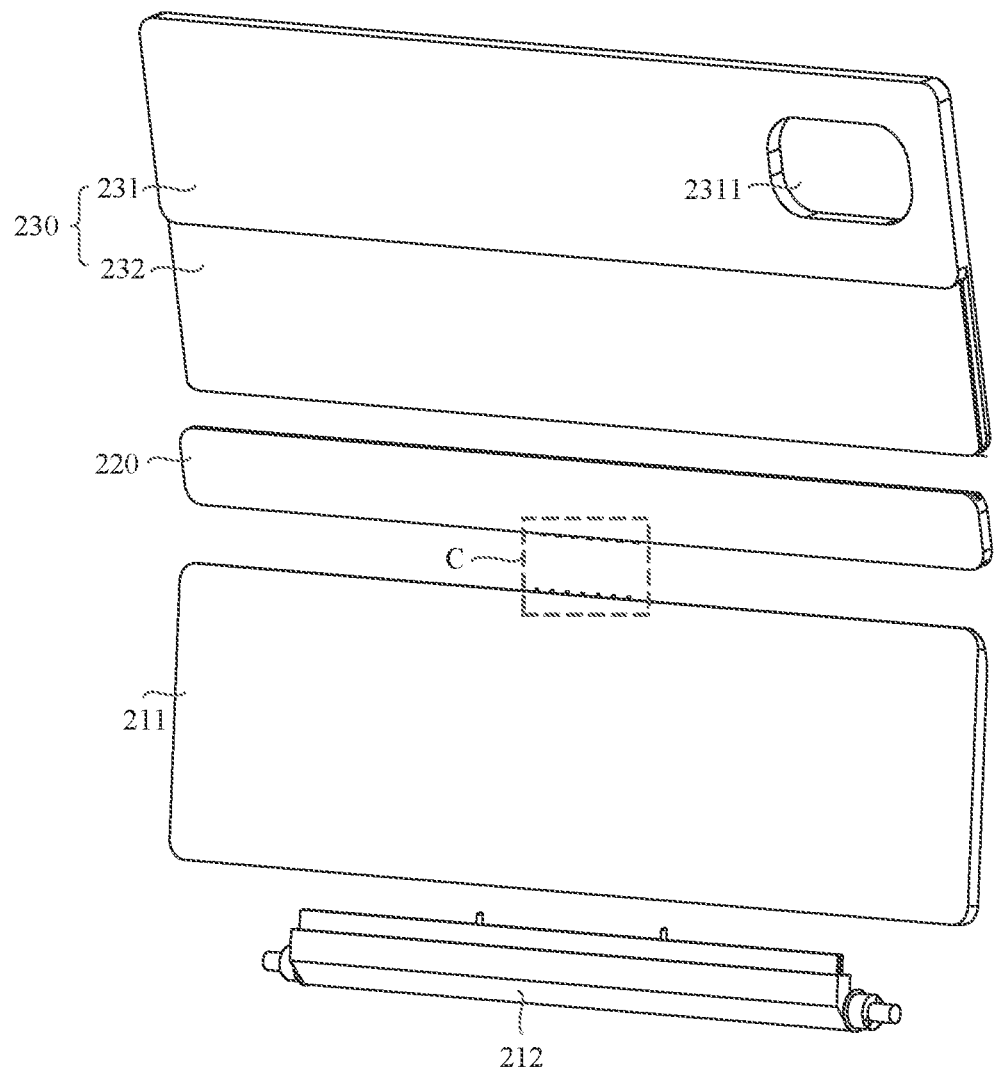
FIG. 4 is a schematic diagram of a split structure of an electronic device protective case according to an embodiment of this application.

As shown in FIG. 3 and FIG. 4, the supporting assembly 210 may include: a support member 211 and a second connecting member 212, where the support member 211 is fixedly connected to the second connecting member 212, the second connecting member 212 is rotatably connected to the keyboard assembly 100, and the support member 211 is rotatably connected to the first connecting member 220. In this way, it can be ensured that the one end of the supporting assembly 210 is rotatably connected to the keyboard assembly 100, and the other end of the supporting assembly 210 is rotatably connected to the first connecting member 220.

The second connecting member 212 may include: a first connecting portion 2121 and a second connecting portion 2122, where the first connecting portion 2121 is fixedly connected to the second connecting portion 2122, the first connecting portion 2121 is rotatably connected to the keyboard assembly 100, and the second connecting portion 2122 is fixedly connected to the support member 211. In this way, it can be ensured that one end of the second connecting member 212 is fixedly connected to the support member 211, and the other end of the second connecting member 212 is rotatably connected to the keyboard assembly 100.

In this embodiment of this application, the keyboard assembly 100 may include: a keyboard body 110 and a third connecting portion 120, where the keyboard body 110 is connected to the third connecting portion 120, and a first mounting hole 121 is disposed on the third connecting portion 120.

In addition, the first connecting portion 2121 may include: a body portion 2123 and a first rotating shaft 2124, where the body portion 2123 is fixedly connected to the first rotating shaft 2124, the first rotating shaft 2124 is located in the first mounting hole 121, and the first rotating shaft 2124 and the first mounting hole 121 rotatably match each other. The first rotating shaft 2124 on the first connecting portion 2121 and the first mounting hole 121 on the third connecting portion 120 rotatably match each other, so that the first connecting portion 2121 can be rotatably connected to the third connecting portion 120, and the second connecting member 212 can be rotatably connected to the keyboard assembly 100.

Figure 6:
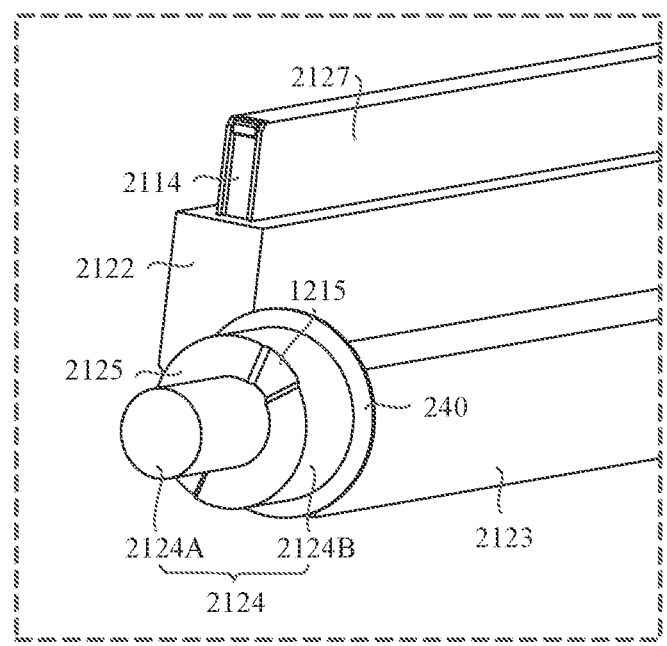
FIG. 6 is an enlarged schematic view of a position A in FIG. 5.

With reference to FIG. 6, in this embodiment of this application, the first rotating shaft 2124 may include: a first rotating shaft portion 2124A and a second rotating shaft portion 2124B, where the first rotating shaft portion 2124A is fixedly connected to the second rotating shaft portion 2124B, one end that is of the second rotating shaft portion 2124B and that is away from the first rotating shaft portion 2124A is fixedly connected to the body portion 2123, and a diameter of the second rotating shaft portion 2124B is greater than a diameter of the first rotating shaft portion 2124A.

The first mounting hole 121 may include: a first sub-mounting hole 1211 and a second sub-mounting hole 1212, where the first sub-mounting hole 1211 is connected to the second sub-mounting hole 1212, and an inner diameter of the second sub-mounting hole 1212 is greater than an inner diameter of the first sub-mounting hole 1211.

In this embodiment of this application, the first rotating shaft portion 2124A matches the first sub-mounting hole 1211, and the second rotating shaft portion 2124B matches the second sub-mounting hole 1212. The first rotating shaft 2124 is designed as the first rotating shaft portion 2124A and the second rotating shaft portion 2124B that are connected to each other and that are of different diameters, and the first mounting hole 121 is designed as the first sub-mounting hole 1211 and the second sub-mounting hole 1212 that are connected to each other and that are of different inner diameters. The first rotating shaft portion 2124A with a smaller diameter matches the first sub-mounting hole 1211 with a smaller inner diameter, and the second rotating shaft portion 2124B with a larger diameter matches the second sub-mounting hole 1212 with a larger inner diameter, so that rotation performance between the second connecting member 212 and the keyboard assembly 100 can be improved.

In this embodiment of this application, a first step surface 1213 may be formed between the first sub-mounting hole 1211 and the second sub-mounting hole 1212; at least one protrusion 1214 may be disposed on one of the first step surface 1213 and an end surface of an end that is of the second rotating shaft portion 2124B and that faces the first rotating shaft portion 2124A (that is, a second step surface 2125 in FIG. 6), and at least one recessed portion 1215 may be disposed on the other of the first step surface 1213 and the end surface of the end that is of the second rotating shaft portion 2124B and that faces the first rotating shaft portion 2124A; and when the protrusion 1214 matches the recessed portion 1215, the first step surface 1213 fits the end surface of the end that is of the second rotating shaft portion 2124B and that faces the first rotating shaft portion 2124A.

Figure 7:
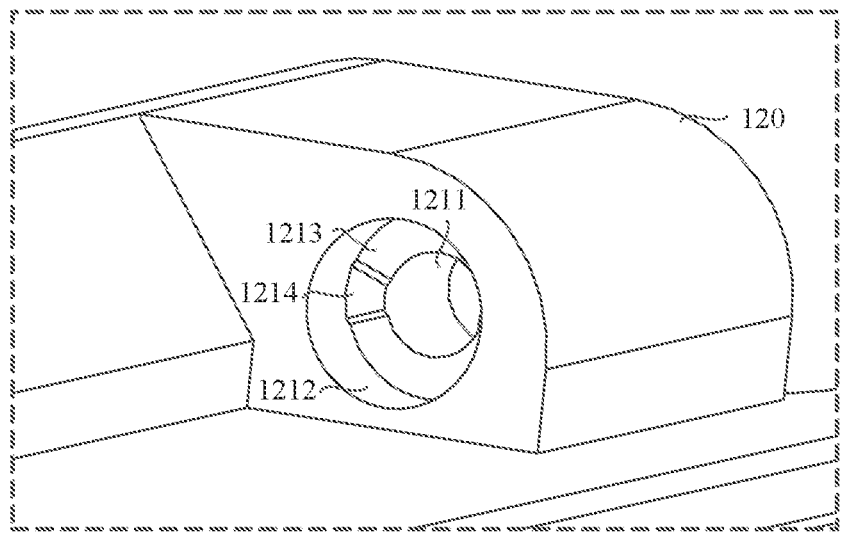
FIG. 7 is an enlarged schematic view of a position B in FIG. 2.

Specifically, at least one protrusion 1214 (as shown in FIG. 7) may be disposed on the first step surface 1213, and at least one recessed portion 1215 (as shown in FIG. 6) may be disposed on the end surface of the end that is of the second rotating shaft portion 2124B and that faces the first rotating shaft portion 2124A. In this case, when the protrusion 1214 matches the recessed portion 1215, the first step surface 1213 fits the end surface of the end that is of the second rotating shaft portion 2124B and that faces the first rotating shaft portion 2124A. Alternatively, at least one recessed portion 1215 may be disposed on the first step surface 1213, and at least one protrusion 1214 may be disposed on the end surface of the end that is of the second rotating shaft portion 2124B and that faces the first rotating shaft portion 2124A. In this case, when the protrusion 1214 matches the recessed portion 1215, the first step surface 1213 fits the end surface of the end that is of the second rotating shaft portion 2124B and that faces the first rotating shaft portion 2124A.

It is easy to understand that, when the first rotating shaft portion 2124A and the first sub-mounting hole 1211 rotatably match each other, and the second rotating shaft portion 2124B and the second sub-mounting hole 1212 rotatably match each other, the first step surface 1213 between the first sub-mounting hole 1211 and the second sub-mounting hole 1212 fits the end surface of the end that is of the second rotating shaft portion 2124B and that faces the first rotating shaft portion 2124A; at least one protrusion 1214 or at least one recessed portion 1215 is disposed on the first step surface 1213, and at least one recessed portion 1215 or at least one protrusion 1214 is disposed on the end surface of the end that is of the second rotating shaft portion 2124B and that faces the first rotating shaft portion 2124A, so that the protrusion 1214 matches the recessed portion 1215, to provide damping for rotation between the second connecting member 212 and the keyboard assembly 100, and ensure that rotation between the second connecting member 212 and the keyboard assembly 100 is a variable torsion force mechanism.

Still referring to FIG. 6, in this embodiment of this application, the protective case 200 may further include a compression spring 240, where one end of the compression spring 240 is fixedly connected to the body portion 2123 of the first connecting portion 2121, and the other end of the compression spring 240 is fixedly connected to the second rotating shaft portion 2124B of the first rotating shaft 2124. In this way, when the first rotating shaft 2124 and the first mounting hole 121 implement torque change through matching between the protrusion 1214 and the recessed portion 1215 during relative rotation, the compression spring 240 can provide a variable torsion force action for matching rotation between the first rotating shaft 2124 and the first mounting hole 121.

Figure 8:
FIG. 8 is a schematic diagram of a structure of an electronic device assembly according to an embodiment of this application.
Figure 9:
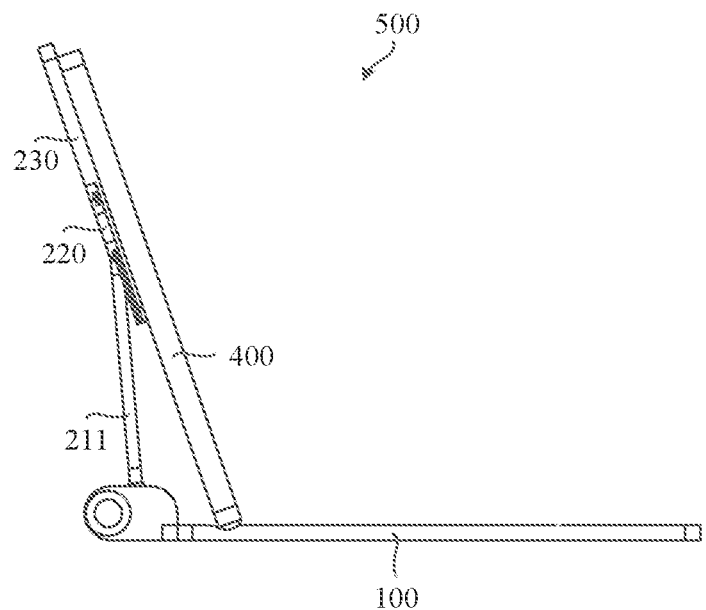
FIG. 9 is a schematic diagram of a structure of an electronic device assembly according to an embodiment of this application.
Figure 10:
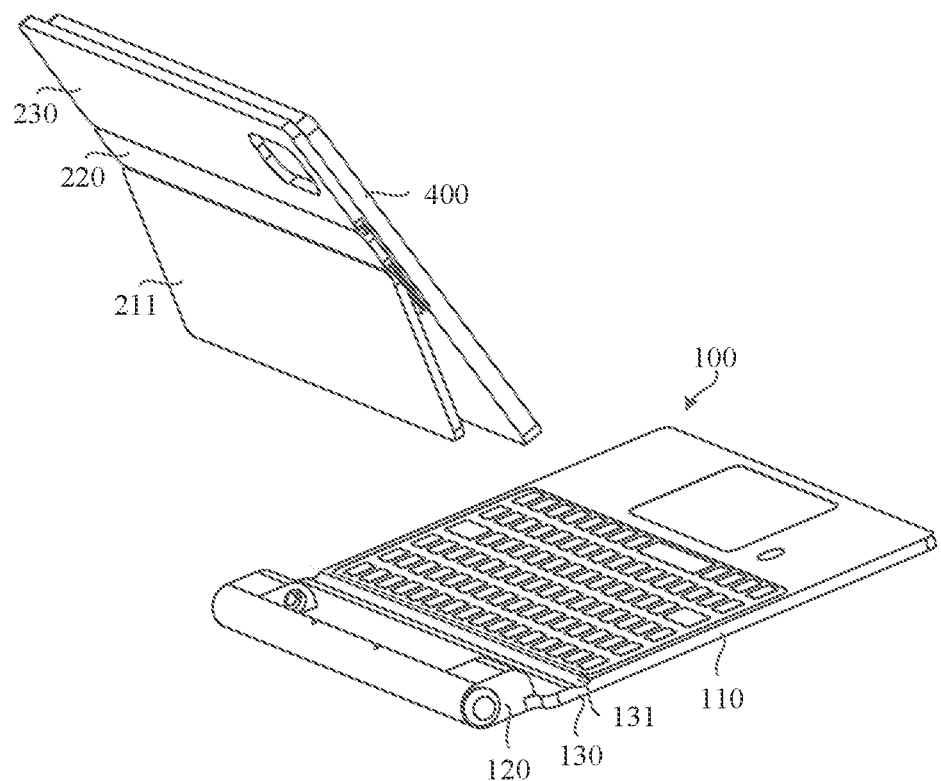
FIG. 10 is a schematic diagram of a split structure of a second connecting member and a support member in an electronic device assembly according to an embodiment of this application.
Figure 11:
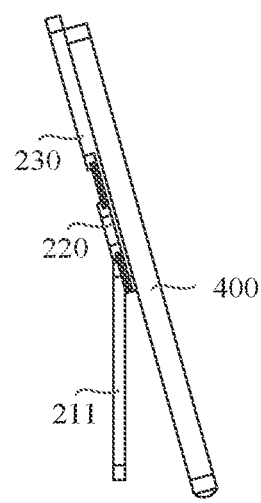
FIG. 11 is a schematic diagram of a structure of an electronic device assembly after a keyboard assembly is detached according to an embodiment of this application.

It should be noted that, in this embodiment of this application, the support member 211 and the second connecting member 212 may be detachably connected. Therefore, when the keyboard assembly 100 is required, the support member 211 is connected to the second connecting member 212 (as shown in FIG. 8 and FIG. 9), and the second connecting member 212 is rotatably connected to the keyboard assembly 100, so that matching between the electronic device 400 and the keyboard assembly 100 and a supporting action are implemented. When the keyboard assembly 100 is not required, the support member 211 and the second 212 are detached and separated from each other, and the second connecting member 212 and the keyboard assembly 100 are removed. As shown in FIG. 10 and FIG. 11, a matching relationship between the support member 211, the first connecting member 220, and the first fastening member 230 is adjusted, to implement an adjustment of a random support angle of the electronic device 400 and a plurality of placement postures.

Figure 5:
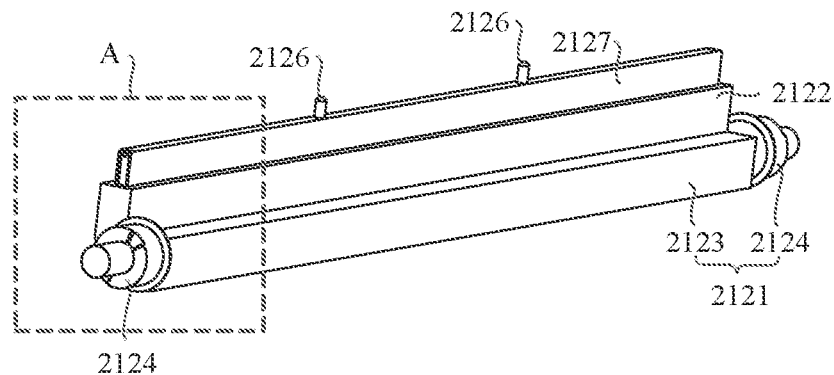
FIG. 5 is a schematic diagram of a structure of a second connecting member of an electronic device protective case according to an embodiment of this application.

In some embodiments, the support member 211 may include at least one first contact (not shown in the figure), the second connecting member 212 may include at least one second contact 2126 (as shown in FIG. 5), and the first contact is electrically connected to the second contact 2126.

The at least one first contact on the support member 211 is electrically connected to the at least one second contact 2126 on the second connecting member 212, so that a function such as a signal transmission function, a data transmission function, or a charging function between the support member 211 and the second connecting member 212 may be implemented. In this way, when the support member 211 is connected to the second connecting member 212, signal transmission between the keyboard assembly 100 and the electronic device 400 can be easily implemented; and when the support member 211 is detached and separated from the second connecting member 212, signal transmission between the keyboard assembly 100 and the electronic device 400 can be cut off with separation between the first contact and the second contact 2126.

Alternatively, in some other embodiments, a manner of using the first contact and the second contact 2126 may be replaced by another manner. For example, the keyboard assembly 100 and the electronic device 400 may be interconnected through a communication network, to implement interaction of radio signals. The communication network may be, but is not limited to, a short-range communication network, such as a Wi-Fi hotspot network, a Wi-Fi peer-to-peer (peer-to-peer, P2P) network, a Bluetooth network, a zigbee network, or a near field communication (near field communication, NFC) network.

Figure 12:
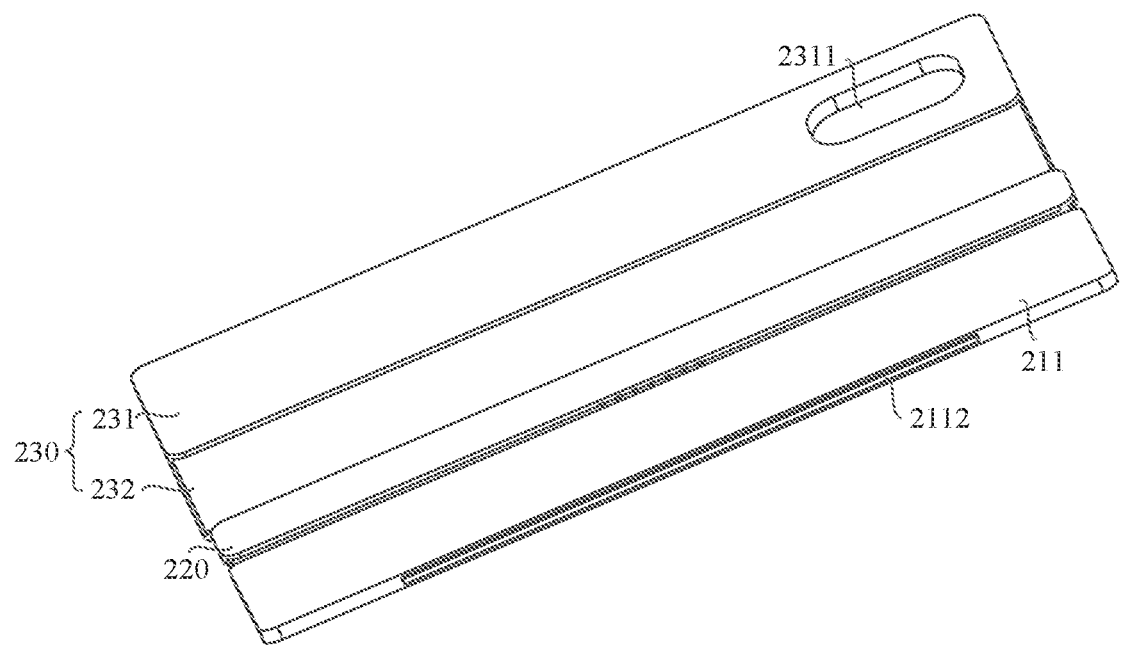
FIG. 12 is a schematic diagram of a structure of a first fastening member, a first connecting member, and a first support member of an electronic device protective case according to an embodiment of this application.

In a possible implementation, as shown in FIG. 5 or FIG. 6, the second connecting member 212 may further include an extending portion 2127, where a first groove 2112 (as shown in FIG. 12) may be provided on one end that is of the support member 211 and that is close to the second connecting member 212, one end of the extending portion 2127 is connected to the second connecting portion 2122, the other end of the extending portion 2127 extends into the first groove 2112, and the extending portion 2127 is detachably connected to the first groove 2112.

The extending portion 2127 of the second connecting member 212 extends into the first groove 2112 of the support member 211, so that stability of a connection between the second connecting member 212 and the support member 211 can be improved. In addition, the extending portion 2127 is detachably connected to the first groove 2112, so that the support member 211 is detachably connected to the second connecting member 212.

In some embodiments, the first contact may be located in the first groove 2112, and the second contact 2126 may be located on the extending portion 2127. In this way, the extending portion 2127 extends into the first groove 2112, so that the first contact is electrically connected to the second contact 2126.

In this embodiment of this application, at least one protruding portion (not shown in the figure) may be disposed on one of an outer side wall of the extending portion 2127 and an inner side wall of the first groove 2112, at least one second groove 2114 may be disposed on the other of the outer side wall of the extending portion 2127 and the inner side wall of the first groove 2112, and the protruding portion matches the second groove 2114.

Specifically, the at least one protruding portion may be disposed on the outer side wall of the extending portion 2127, the at least one second groove 2114 may be disposed on the inner side wall of the first groove 2112, and the protruding portion matches the second groove 2114. Alternatively, the at least one second groove 2114 may be disposed on the outer side wall of the extending portion 2127, the at least one protruding portion may be disposed on the inner side wall of the first groove 2112, and the protruding portion matches the second groove 2114.

The at least one protruding portion or the at least one second groove 2114 is disposed on the outer side wall of the extending portion 2127, and the at least one second groove 2114 or the at least one protruding portion is disposed on the inner side wall of the first groove 2112, when the extending portion 2127 extends into the first groove 2112, the outer side wall of the extending portion 2127 comes into contact with the inner side wall of the first groove 2112; and in this case, the protruding portion extends into the second groove 2114, and the protruding portion is inserted into the second groove 2114, to form a buckle structure together, thereby avoiding separation of the extending portion 2127 from the first groove 2112, and improving reliability of a connection between the extending portion 2127 and the first groove 2112.

In some embodiments, one of the extending portion 2127 and the first groove 2112 may has a magnetic adsorption force, at least a part of the extending portion 2127 extends into the first groove 2112, and at least a part of the extending portion 2127 adsorbs an inner wall of the first groove 2112. In this way, the extending portion 2127 can be adsorbably connected to the first groove 2112, thereby avoiding separation of the extending portion 2127 from the first groove 2112, and improving reliability of a connection between the extending portion 2127 and the first groove 2112.

It should be noted that, in this embodiment of this application, the extending portion 2127 may have a magnetic adsorption force, and when at least a part of the extending portion 2127 extends into the first groove 2112, at least a part of the extending portion 2127 adsorbs the inner wall of the first groove 2112. Alternatively, the first groove 2112 may have a magnetic adsorption force, and when at least a part of the extending portion 2127 extends into the first groove 2112, at least a part of the extending portion 2127 adsorbs the inner wall of the first groove 2112.

In this embodiment of this application, one end that is of the support member 211 and that is close to the first connecting member 220 may be provided with the second rotating shaft (not shown in the figure), one end that is of the first connecting member 220 and that is close to the support member 211 may be provided with a second fastening member (not shown in the figure), a second mounting hole (not shown in the figure) is disposed on the second fastening member, the second rotating shaft is located in the second mounting hole, and the second rotating shaft and the second mounting hole rotatably match each other.

Alternatively, in some other embodiments, one end that is of the support member 211 and that is close to the first connecting member 220 may be provided with a second fastening member, one end that is of the first connecting member 220 and that is close to the support member 211 may be provided with a second rotating shaft, a second mounting hole is disposed on the second fastening member, the second rotating shaft is located in the second mounting bole, and the second rotating shaft and the second mounting hole rotatably match each other.

It should be noted that the foregoing two implementations ensure that the second rotating shaft and the second mounting hole rotatably match each other, that is, the support member 211 is rotatably connected to the first connecting member 220. Further, based on the two implementations, in this embodiment of this application, the second rotating shaft and the second mounting hole may be provided with a friction plate (not shown in the figure), to increase a friction force generated when the second rotating shaft relatively rotates in the second mounting hole.

Figure 13:
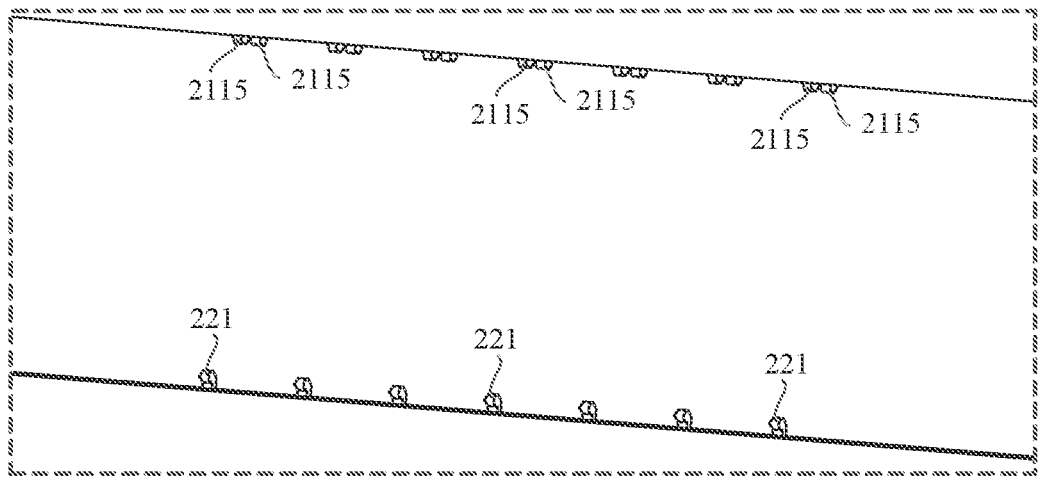
FIG. 13 is an enlarged schematic view of a position C in FIG. 4.

In addition, in some embodiments, the support member 211 may be rotatably connected to the first connecting member 220 in another manner. For example, as shown in FIG. 13, one end that is of the support member 211 and that is close to the first connecting member 220 may be provided with a first rotating member 2115, one end that is of the first connecting member 220 and that is close to the support member 211 may be provided with a second rotating member 221, and the first rotating member 2115 and the second rotating member 221 tightly match each other, to implement mutual rotation between the support member 211 and the first connecting member 220.

Similarly, in this embodiment of this application, a friction plate (not shown in the figure) may be disposed between the first rotating member 2115 and the second rotating member 221, to increase a friction force generated when the first rotating member 2115 and the second rotating member 221 rotate relative to each other.

It should be noted that, in this embodiment of this application, when the support member 211 and the first connecting member 220 are rotatably connected, a torsion force generated when the support member 211 and the first connecting member 220 rotatably match each other is a constant value.

Figure 14:
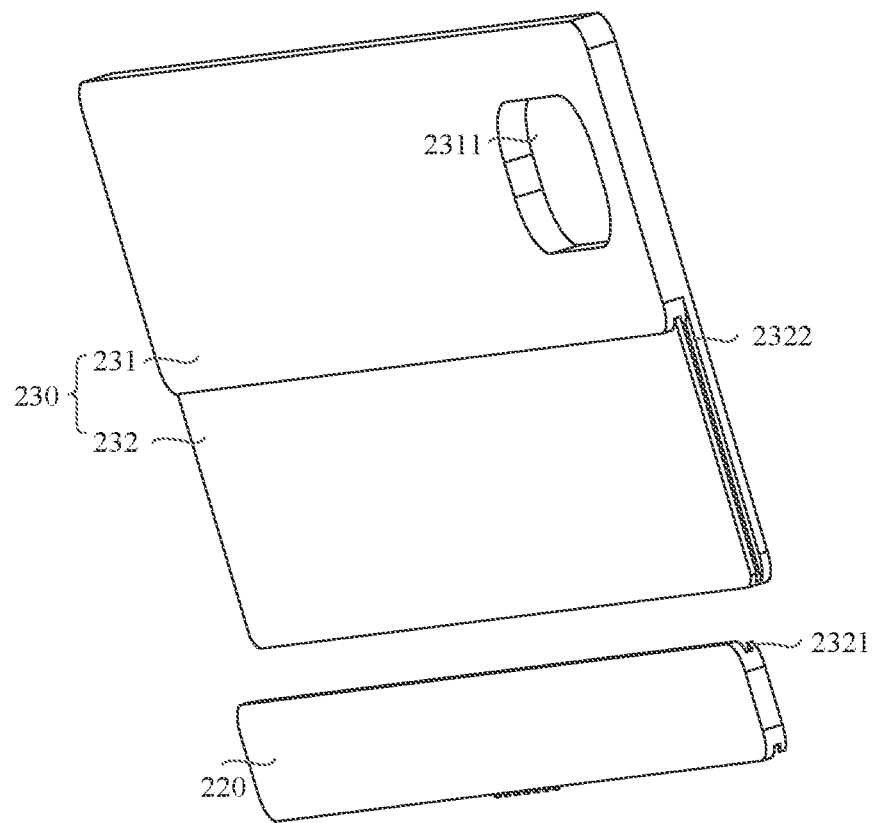
FIG. 14 is a schematic diagram of a structure of a first fastening member and a first connecting member of an electronic device protective case according to an embodiment of this application.
Figure 15:
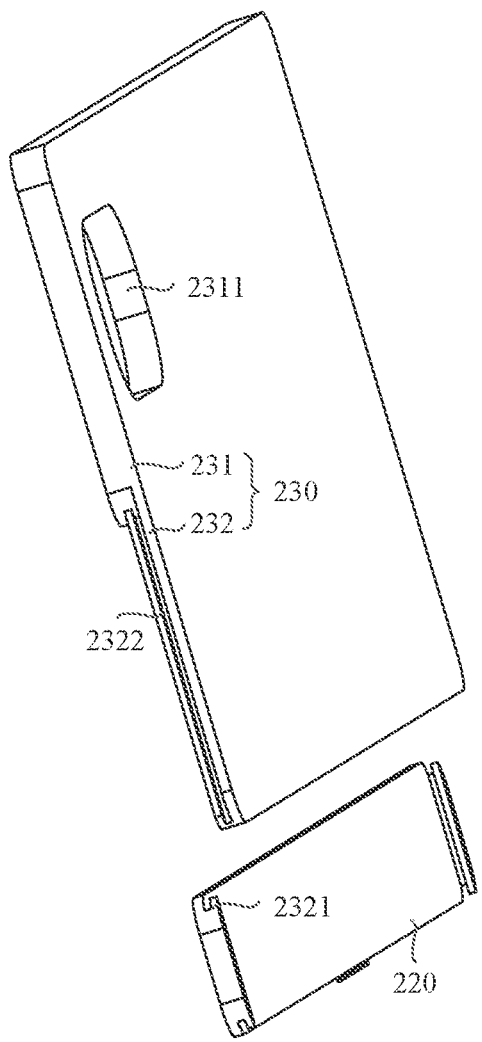
FIG. 15 is a schematic diagram of a structure of a first fastening member and a first connecting member of an electronic device protective case according to an embodiment of this application.

Referring to FIG. 14 and FIG. 15, the first fastening member 230 may include: a first part 231 and a second part 232, where the first part 231 is fixedly connected to the second part 232, a slider 2321 may be disposed on one of the second part 232 and the first connecting member 220, a slide rail 2322 may be disposed on the other of the second part 232 and the first connecting member 220, and the slider 2321 and the slide rail 2322 slidably match each other.

It can be understood that, in this embodiment of this application, the slider 2321 may be disposed on the second part 232 of the first fastening member 230, the slide rail 2322 may be disposed on the first connecting member 220, and the slider 2321 and the slide rail 2322 slidably match each other. Alternatively, the slider 2321 may be disposed on the first connecting member 220, the slide rail 2322 may be disposed on the second part 232 of the first fastening member 230, and the slider 2321 and the slide rail 2322 slidably match each other. The two implementations can ensure that the slider 2321 and the slide rail 2322 slidably match each other, that is, ensure that the first connecting member 220 is slidably connected to the first fastening member 230.

In this embodiment of this application, an opening 2311 may be provided on the first part 231 of the first fastening member 230, and the opening 2311 is opposite to a camera of the electronic device 400. The opening 2311 on the first fastening member 230 is opposite to the camera of the electronic device 400, so that the camera of the electronic device 400 can be exposed, so as to ensure normal operation and shooting performance of the camera.

In addition, in a possible implementation, the first connecting member 220 and the first fastening member 230 may be provided with a matching damping mechanism or a matching buckle mechanism (not shown in the figure), and the damping mechanism or the buckle mechanism is configured to limit a sliding range of sliding of the first connecting member 220 along the first fastening member 230. When the damping mechanism or the buckle mechanism is matching, the first connecting member 220 and the first fastening member 230 are locked to each other, and relative sliding cannot be generated between the first connecting member 220 and the first fastening member 230. After the damping mechanism or the buckle mechanism is tripped, the first connecting member 220 may continue to slide along the first fastening member 230.

As shown in FIG. 1 or FIG. 2, the keyboard assembly 100 may further include a fourth connecting portion 130, where the fourth connecting portion 130 may be located between the keyboard body 110 and the third connecting portion 120, and one side of the fourth connecting portion 130 is fixedly connected to the keyboard body 110, and the other side of the fourth connecting portion 130 is fixedly connected to the third connecting portion 120.

In this embodiment of this application, the fourth connecting portion 130 may be provided with an accommodating groove 131, a bottom end of the electronic device 400 is located in the accommodating groove 131, and the bottom end of the electronic device 400 and the accommodating groove 131 rotatably match each other. The accommodating groove 131 is disposed on the fourth connecting portion 130 of the keyboard assembly 100, and the bottom end of the electronic device 400 is located in the accommodating groove 131, and the bottom end of the electronic device 400 and the accommodating groove 131 rotatably match each other, so that the electronic device 400 can be supported by the keyboard assembly 100 as the bottom end of the electronic device 400 relatively rotates in the accommodating groove 131, so as to implement an adjustment of a random support angle of the electronic device 400.

In some embodiments, at least one of the bottom end of the electronic device 400 and the accommodating groove 131 may have a magnetic adsorption force, the bottom end of the electronic device 400 rotates in the accommodating groove 131, and the bottom end of the electronic device 400 adsorbs a bottom wall of the accommodating groove 131. In this way, the bottom end of the electronic device 400 can be adsorbably connected to the accommodating groove 131, thereby avoiding separation of the bottom end from the electronic device 400 and the accommodating groove 131, and improving reliability of a connection between the bottom end of the electronic device 400 and the accommodating groove 131.

It should be noted that, in this embodiment of this application, the bottom end of the electronic device 400 may have a magnetic adsorption force, or the accommodating groove 131 may have a magnetic adsorption force, or the bottom end of the electronic device 400 and the accommodating groove 131 each may have a magnetic adsorption force. This is not limited in this embodiment of this application.

Further, in a possible implementation, the accommodating groove 131 may be a circular arc groove. In this case, the electronic device 400 may include: an electronic device body 410 and a circular arc portion 420, where the electronic device body 410 is fixedly connected to the circular arc portion 420, and the circular arc portion 420 matches the circular arc groove. The accommodating groove 131 is designed as a circular arc groove, and the bottom end of the electronic device 400 is designed as the circular arc portion 420 that is in a circular arc shape. When the circular arc portion 420 matches the circular arc groove, rotation smoothness between the circular arc portion 420 and the circular arc groove can be improved, thereby improving smoothness when the bottom end of the electronic device 400 and the accommodating groove 131 rotatably match each other.

Further, in this embodiment of this application, a magnetic member 250 may be disposed on at least one of the circular arc portion 420 and the circular arc groove, and a central axis of the magnetic member 250 does not coincide with a central axis of each of the circular arc portion 420 and the circular arc groove.

For example, the magnetic member 250 may be disposed on the circular arc portion 420, or the magnetic member 250 may be disposed on the circular arc groove, or the magnetic member 250 may be disposed on each of the circular arc portion 420 and the circular arc groove. This is not limited in this embodiment of this application.

Figure 16:
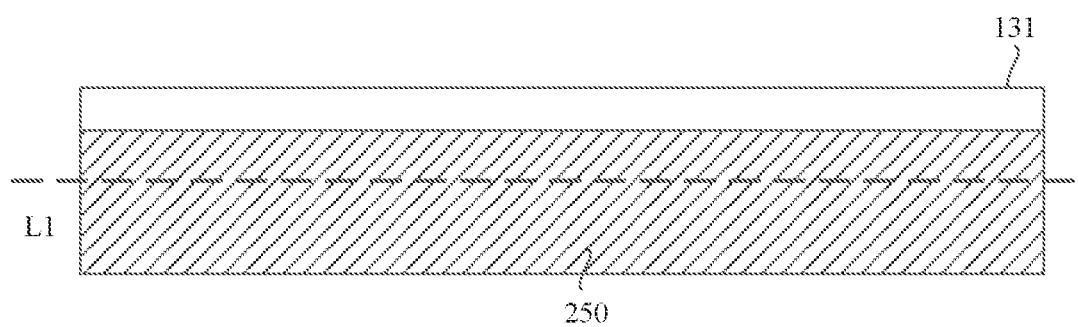
FIG. 16 is a schematic diagram of a structure in which a magnetic member is disposed in an accommodating groove of a fourth connecting portion in a keyboard assembly according to an embodiment of this application.

The central axis of the magnetic member 250 does not coincide with the central axis of each of the circular arc portion 420 and the circular arc groove, thereby ensuring that the magnetic member 250 is a bias magnetic member 250 relative to the circular arc portion 420 and the circular arc groove. For example, in FIG. 16, the magnetic member 250 is biased relative to a center axis L1 of the circular arc groove. In this case, when the circular arc portion 420 relatively rotates in the circular arc groove, a magnetic adsorption force between the circular arc portion 420 and the circular arc groove may be gradually increased in a process of opening the electronic device 400 relative to the keyboard assembly 100, and may be gradually decreased in a process of closing the electronic device 400 relative to the keyboard assembly 100, so as to adapt to an actual application needs when the electronic device 400 is opened or closed relative to the keyboard assembly 100.

In addition, the bias magnetic member 250 is disposed, to make it easier to cancel magnetic adsorption between the circular arc portion 420 and the circular arc groove, that is, when separation of the circular arc portion 420 and the arc groove is required, the bias magnetic member 250 makes it easier to demagnetize between the circular arc portion 420 and the circular arc groove.

For example, when the bottom end of the electronic device 400 and the accommodating groove 131 absorb each other, as the opening and closing angle becomes larger, a magnetic adsorption region is greater until the magnetic adsorption region reaches 100%, and an adsorption force increases; otherwise, the magnetic adsorption region becomes smaller, and the adsorption force decreases.

It should be noted that, in this embodiment of this application, the magnetic member 250 may be a magnet, and the bias magnetic member 250 may be a bias magnet.

In this embodiment of this application, an implementation in which the bottom end of the electronic device 400 and the accommodating groove 131 rotatably match each other in the accommodating groove 131 can also be adjusted as follows: Specifically, a recessed region may be disposed on the fourth connecting portion 130 of the keyboard assembly 100, the accommodating groove 131 may be disposed at a position corresponding to the recessed region, the bottom end of the electronic device 400 is fixedly connected to the accommodating groove 131, and the accommodating groove 131 and the recessed region on the fourth connecting portion 130 rotatably match each other, that is, the accommodating groove 131 and the fourth connecting portion 130 of the keyboard assembly 100 rotatably match each other as two mutually independent components. In this way, dry friction generated when the bottom end of the electronic device 400 rotates in the accommodating groove 131 can be avoided, so as to prevent the bottom end of the electronic device 400 from wearing out, thereby protecting the electronic device 400 to some extent.

The following describes an operating principle of an electronic device protective case 300.

Figure 17:
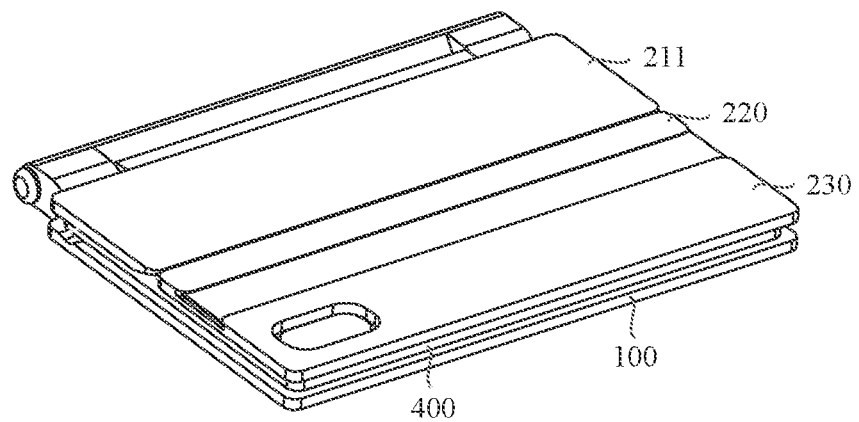
FIG. 17 is a schematic diagram of a structure in which an electronic device is in a closed state relative to a keyboard assembly in an electronic device assembly according to an embodiment of this application.
Figure 18:
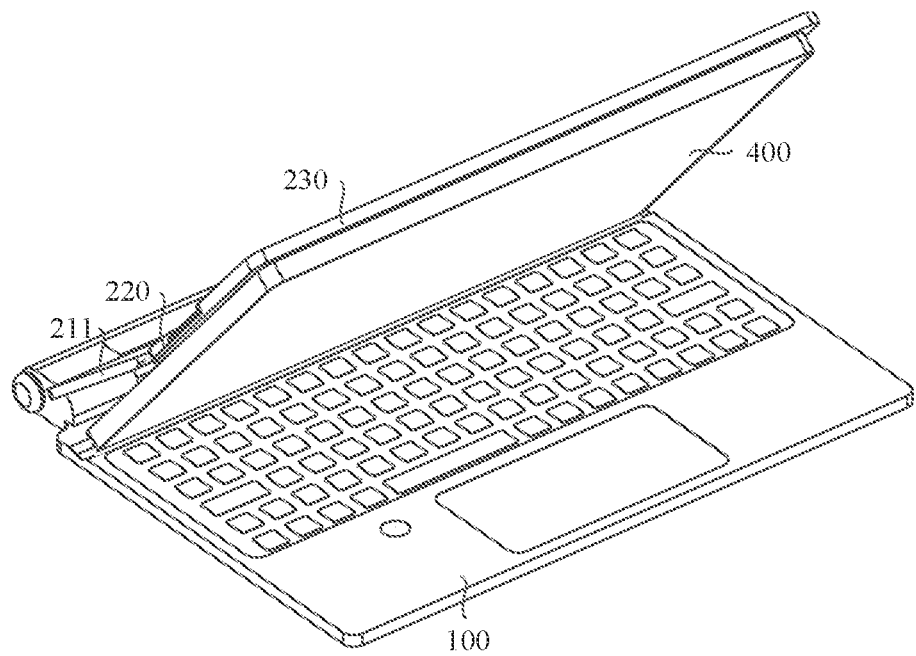
FIG. 18 is a schematic diagram of a structure in which an electronic device is in a semi-open state relative to a keyboard assembly in an electronic device assembly according to an embodiment of this application.
Figure 19:
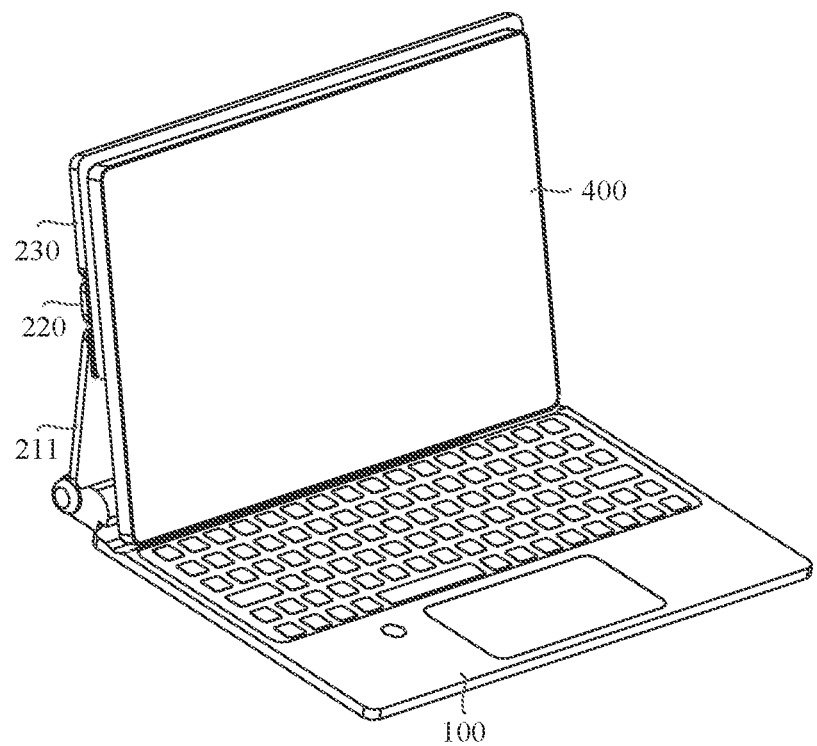
FIG. 19 is a schematic diagram of a structure in which an electronic device in an open state relative to a keyboard assembly in an electronic device assembly according to an embodiment of this application.

FIG. 17 is a schematic diagram in which an electronic device 400 is in a closed state relative to a keyboard assembly 100. FIG. 18 is a schematic diagram in which an electronic device 400 is in a semi-open state relative to a keyboard assembly 100. FIG. 19 is a schematic diagram in which an electronic device 400 in an open state relative to a keyboard assembly 100. Rotation between the keyboard assembly 100 and a supporting assembly 210 serves as a first-stage rotation mechanism, rotation between the supporting assembly 210 and a first connecting member 220 serves as a second-stage rotation mechanism, rotation between a bottom end of the electronic device 400 and the keyboard assembly 100 serves as a third-stage rotation mechanism, and sliding between the first connecting member 220 and a first fastening member 230 serves as a sliding mechanism. The first-stage rotation mechanism is a variable torsion force rotation mechanism, and the second-stage rotation mechanism and the third-stage rotation mechanism each are a constant torsion force rotation mechanism.

During opening of the electronic device 400 relative to the keyboard assembly 100, the first-stage rotation mechanism, the second-stage rotation mechanism, the third-stage rotation mechanism, and the sliding mechanism all move. Specifically, during transition of an electronic device assembly 500 from a state shown in FIG. 17 to a state shown in FIG. 18, when a user holds the keyboard assembly 100 with one hand, and initially opens the electronic device 400 with the other hand, a torsion force of the first-stage rotation mechanism is less than a torsion force of the second-stage rotation mechanism, and in this case, the first-stage rotation mechanism is preferentially rotated, that is, the first-stage rotation mechanism rotates prior to the second-stage rotation mechanism and the sliding mechanism. When the first-stage rotation mechanism rotates to a specific fixed angle, the torsion force of the first-stage rotation mechanism is greater than the torsional force of the second-stage rotation mechanism, and the torsion force of the second-stage rotation mechanism is less than a disabsorbing force of the sliding mechanism. The second-stage rotation mechanism opens an operating mode, that is, the second-stage rotation mechanism rotates prior to the first-stage rotation mechanism and the sliding mechanism.

It should be noted that in the first-stage rotation mechanism, when a first rotating shaft 2124 and a first mounting hole 121 rotatably match each other, a first step surface 1213 between a first sub-mounting hole 1211 and a second sub-mounting hole 1212 matches an end surface of an end that is of a second rotating shaft portion 2124B and that faces a first rotating shaft portion 2124A. When a protrusion 1214 on the first step surface 1213 is opposite to a recessed portion 1215 on the end surface of the end that is of the second rotating shaft portion 2124B and that faces the first rotating shaft portion 2124A, a torsion force between the first rotating shaft 2124 and the first mounting hole 121 is small, and in this case, the torsion force of the first-stage rotation mechanism is less than the torsion force of the second-stage rotation mechanism, and the first-stage rotation mechanism preferentially opens an operating mode. During rotation of the first rotating shaft 2124 with the first mounting hole 121, when a state of the protrusion 1214 on the first step surface 1213 and the recessed portion 1215 on the end surface of the end that is of the second rotating shaft portion 2124B and that faces the first rotating shaft portion 2124A are changed from an opposite state to a staggered state, the first-stage rotation mechanism is in a "climbing state"; that is, in this case, the protrusion 1214 on the first step surface 1213 needs to separate from the recessed portion 1215 on the end surface of the end that is of the second rotating shaft portion 2124B and that faces the first rotating shaft portion 2124A, and the first-stage rotation mechanism needs to overcome resistance of a recessed position and a protruding position. Therefore, the torsion force between the first rotating shaft 2124 and the first mounting hole 121 is increased, the torsion force of the first-stage rotation mechanism is greater than the torsion force of the second-stage rotation mechanism (that is, climbing resistance is greater than resistance generated when the second-stage rotation mechanism rotates), and the second-stage rotation mechanism opens an operating mode.

When the second-stage rotation mechanism keeps rotating until the bottom end of the electronic device 400 matches the accommodating groove 131, the third-stage rotation mechanism opens an operating mode. During transition of the electronic device assembly 500 from a state shown in FIG. 18 to a state shown in FIG. 19, after the third-stage rotation mechanism opens the operating mode, because the bottom end of the electronic device 400 and the accommodating groove 131 in the third-stage rotation mechanism have absorbed each other, to prevent the bottom end of the electronic device 400 and the accommodating groove 131 from disabsorbing, as the third-stage rotation mechanism continues to rotate, a magnetic adsorption region between the bottom end of the electronic device 400 and the accommodating groove 131 becomes larger, so that a disabsorbing force between the bottom end of the electronic device 400 and the accommodating groove 131 increases. In this case, the electronic device 400 and a protective case 200 form a swing lever mechanism, that is, a movement state among the electronic device 400, the keyboard assembly 100, and the supporting assembly 210 has a unique degree of freedom. The third-stage rotation mechanism ensures opening and closing at an angle and does not occupy an operating space of the keyboard assembly 100, and ensures that a center of balance of the electronic device 400 is always in the region of the keyboard assembly 100 without overturning. In this case, the third-stage rotation mechanism rotates prior to the first-stage rotation mechanism, the second-stage rotation mechanism, and the sliding mechanism.

Further, it can be understood that the electronic device 400 is continued to be moved, the sliding mechanism is stopped to work, and the first-stage rotation mechanism overcomes the resistance of climbing, that is, the state of the protrusion 1214 on the first step surface 1213 and the recessed portion 1215 on the end surface of the end that is of the second rotating shaft portion 2124B and that faces the first rotating shaft portion 2124A gradually change from the staggered state to the opposite state, the first-stage rotation mechanism continues to work, and sufficient rotation damping can be provided to ensure that the electronic device 400 can be stable at any position.

In a process of closing the electronic device 400 relative to the keyboard assembly 100, when the electronic device 400 initially starts to be closed, the third-stage rotation mechanism first opens the operating mode, the third-stage rotation mechanism maintains in an adsorbing state, and the movement state among the electronic device 400, the keyboard assembly 100, and the supporting assembly 210 has a unique degree of freedom. In this case, the third-stage rotation mechanism rotates prior to the first-stage rotation mechanism, the second-stage rotation mechanism, and the sliding mechanism. The electronic device 400 is continuously moved, the sliding mechanism reaches a limiting point and no longer slides, while an adsorption force of the third-stage rotation mechanism continuously decreases during closing, and the third-stage rotation mechanism disabsorbs when reaching a limiting state as shown in FIG. 18. Then the second-stage rotation mechanism opens the operating mode, and in this case, the climbing resistance of the first-stage rotation mechanism is greater than the resistance of the second-stage rotation mechanism, that is, the second-stage rotation mechanism rotates prior to the first-stage rotation mechanism. The electronic device 400 is continuously moved, the first-stage rotation mechanism starts to move when the second-stage rotation mechanism is at a limiting position, and the entire electronic device 400 is finally in a fully closed state as shown in FIG. 17.

In this way, in actual use, one hand of the user presses and holds the keyboard assembly 100, and the other hand moves the electronic device 400 in a pushing force state, so that a supporting angle of the electronic device 400 can be flexibly adjusted in linkage in the process of opening or closing, and the opening angle and the closing angle can be freely adjusted without another operation, thereby greatly facilitating use by the user and improving user experience. Therefore, in this embodiment of this application, an adjustment of a random support angle of the electronic device 400 can be implemented, so that a use requirement of the user in more application scenarios can be met, thereby improving use performance of the electronic device 400.

The foregoing implementation in which rotation between the second connecting member 212 and the keyboard assembly 100 is implemented as a variable torsion force movement is a mechanical design. In this embodiment of this application, rotation between the second connecting member 212 and the keyboard assembly 100 may be implemented as a variable torsion force movement in a manner of electromagnetic control, that is, for example, the torsion force of the first-stage rotation mechanism may be increased through electromagnetic control, so that the second-stage rotation mechanism preferentially moves. Specifically, an angle sensor may be disposed on the first rotating shaft 2124. When the angle sensor recognizes that a rotation angle reaches a specific preset value, the angle is locked, so that the first-stage rotation mechanism no longer rotates, and the torsion force of the first-stage rotation mechanism is greater than the torsion force of the second-stage rotation mechanism.

Based on the foregoing embodiment, the electronic device protective case 300 may further include a stylus. The stylus may provide an input to the electronic device 400; and the electronic device 400 performs, based on the input of the stylus, an operation in response to the input. In addition, a touch region may be disposed on a wireless keyboard, the stylus may operate on the touch region of the wireless keyboard, to provide an input to the wireless keyboard; and the wireless keyboard may perform, based on the input of the stylus, an operation in response to the input.

In an embodiment, interconnection may be implemented between the stylus and the electronic device 400, between the stylus and the wireless keyboard, and between the electronic device 400 and the wireless keyboard through a communication network, to implement interaction of radio signals. Similarly, the communication network may be, but is not limited to, a short-range communication network, such as a Wi-Fi hotspot network, a Wi-Fi peer-to-peer (peer-to-peer, P2P) network, a Bluetooth network, a zigbee network, or a near field communication (near field communication, NFC) network.

It can be understood that the structure shown in this embodiment of this application does not constitute a specific limitation on the electronic device protective case 300. In some other embodiments of this application, the electronic device protective case 300 may include more or fewer components than those shown in the figure, or combine some components, or split some components, or have different component arrangements. The illustrated components may be implemented by using hardware, software, or a combination of software and hardware.

The electronic device protective case 300 provided in this embodiment of this application may be further applied to other devices in addition to the electronic device 400, for example, the electronic device protective case 300 may be further applied to a display, to flexibly adjust a placement posture and a placement angle of the display. This is not limited in this embodiment of this application.

In the descriptions of embodiments of this application, it should be noted that unless otherwise specified and defined explicitly, the terms "mount", "connected to" and "connect" should be understood in a broad sense, and for example, may be a fixed connection or an indirect connection by using an intermediate medium, or may be internal communication between two elements or an interaction relationship between two elements. A person of ordinary skill in the art can understand specific meanings of the foregoing terms in embodiments of this application based on a specific situation.

The device or element referred to in or implied in embodiments of this specification needs to have a specific orientation, be constructed and operated in a specific orientation, and therefore cannot be construed as a limitation on embodiments of this specification. In the descriptions of embodiments of this application, "a plurality of" means two or more, unless otherwise specifically defined.

In the specification of embodiments, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in orders except the order illustrated or described herein. In addition, the terms "may include" and "have", and any variations thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

Finally, it should be noted that the foregoing embodiments are only used to illustrate the technical solutions of embodiments of this application, but are not used to limit this application. Although embodiments of this application have been described in detail with reference to the foregoing embodiments, it should be understood by a person of ordinary skill in the art that the technical solutions described in the foregoing embodiments may still be modified, or some or all technical features thereof may be equivalently replaced. These modifications or replacements do not make the essence of the corresponding technical solutions depart from the scope of the technical solutions of embodiments of this application.

What is claimed is:

1. An electronic device protective case, comprising at least:
    a keyboard assembly and a protective case, wherein
    the protective case comprises: a supporting assembly, a first connecting member, and a first fastening member;

one end of the supporting assembly is rotatably connected to the keyboard assembly, the other end of the supporting assembly is rotatably connected to the first connecting member, and the first connecting member is further slidably connected to the first fastening member, wherein the supporting assembly comprises: a support member and a second connecting member fixedly connected to the support member, wherein the second connecting member comprises a first connecting portion that is rotatably connected to the keyboard assembly, wherein the keyboard assembly comprises: a keyboard body and a third connecting portion connected to the keyboard body, a first mounting hole is disposed on the third connecting portion, and the first connecting portion comprises: a body portion and a first rotating shaft fixedly connected to the body portion, wherein the first rotating shaft is located in the first mounting hole, and the first rotating shaft and the first mounting hole rotatably match each other, wherein the first rotating shaft comprises:
- a first rotating shaft portion and a second rotating shaft portion fixedly connected to the first rotating shaft portion, wherein
- a diameter of the second rotating shaft portion is greater than a diameter of the first rotating shaft portion, and one end that is of the second rotating shaft portion and that is away from the first rotating shaft portion is fixedly connected to the body portion;
- the first mounting hole comprises: a first sub-mounting hole and a second sub-mounting hole connected to the first sub-mounting hole; and
- an inner diameter of the second sub-mounting hole is greater than an inner diameter of the first sub-mounting hole, the first rotating shaft portion matches the first sub-mounting hole, and the second rotating shaft portion matches the second sub-mounting hole; and
- a surface that is of the first fastening member and that is away from the first connecting member is fixedly connected to an electronic device.

2. The electronic device protective case according to claim 1, wherein
the second connecting member is rotatably connected to the keyboard assembly, and the support member is rotatably connected to the first connecting member.

3. The electronic device protective case according to claim 2, wherein the second connecting member comprises: a second connecting portion fixedly connected to the first connecting portion; and
the second connecting portion is fixedly connected to the support member.

4. The electronic device protective case according to claim 1, wherein a first step surface is formed between the first sub-mounting hole and the second sub-mounting hole;
at least one protrusion is disposed on one of the first step surface and an end surface of an end that is of the second rotating shaft portion and that faces the first rotating shaft portion, and at least one recessed portion is disposed on the other of the first step surface and the end surface of the end that is of the second rotating shaft portion and that faces the first rotating shaft portion; and
when the protrusion matches the recessed portion, the first step surface fits the end surface of the end that is of the second rotating shaft portion and that faces the first rotating shaft portion.

5. The electronic device protective case according to claim 4, wherein the protective case further comprises a compression spring; and one end of the compression spring is fixedly connected to the body portion, and the other end of the compression spring is fixedly connected to the second rotating shaft portion.

6. The electronic device protective case according to claim 2, wherein the support member is detachably connected to the second connecting member.

7. The electronic device protective case according to claim 6, wherein the second connecting member comprises at least one second contact.

8. The electronic device protective case according to claim 7, wherein the second connecting member further comprises an extending portion;
a first groove is provided on one end that is of the support member and that is close to the second connecting member; and
one end of the extending portion is connected to a second connecting portion comprised in the second connecting member, the other end of the extending portion extends into the first groove, and the extending portion is detachably connected to the first groove.

9. The electronic device protective case according to claim 8, wherein at least one second groove is disposed on one of an outer side wall of the extending portion and an inner side wall of the first groove.

10. The electronic device protective case according to claim 8, wherein one of the extending portion and the first groove has a magnetic adsorption force; and
at least a part of the extending portion extends into the first groove, and adsorbs an inner wall of the first groove.

11. The electronic device protective case according to claim 2, wherein one end that is of the support member and that is close to the first connecting member is provided with a second rotating shaft; or
one end that is of the first connecting member and that is close to the support member is provided with a second rotating shaft.

12. The electronic device protective case according to claim 1, wherein the first fastening member comprises: a first part and a second part fixedly connected to the first part;
a slider is disposed on one of the second part and the first connecting member, and a slide rail is disposed on the other of the second part and the first connecting member; and
the slider and the slide rail slidably match each other.

13. The electronic device protective case according to claim 1, wherein the keyboard assembly further comprises a fourth connecting portion;
the fourth connecting portion is located between the keyboard body and the third connecting portion, and the fourth connecting portion is fixedly connected to each of the keyboard body and the third connecting portion; and
an accommodating groove is disposed on the fourth connecting portion, a bottom end of the electronic device is located in the accommodating groove, and the bottom end of the electronic device and the accommodating groove rotatably match each other.

14. The electronic device protective case according to claim 13, wherein at least one of the bottom end of the electronic device and the accommodating groove has a magnetic adsorption force; and the bottom end of the electronic device rotates in the accommodating groove, and adsorbs a bottom wall of the accommodating groove.

15. The electronic device protective case according to claim 14, wherein the accommodating groove is a circular arc groove; and
the electronic device comprises: an electronic device body and a circular arc portion fixedly connected to the electronic device body, and the circular arc portion matches the circular arc groove.

16. The electronic device protective case according to claim 15, wherein a magnetic member is disposed on at least one of the circular arc portion and the circular arc groove, and a central axis of the magnetic member does not coincide with each of a central axis of the circular arc portion and a central axis of the circular arc groove.

17. An electronic device assembly, comprising at least: an electronic device and an electronic device protective case; wherein
the electronic device protective case comprises a keyboard assembly and a protective case wherein
the protective case comprises: a supporting assembly, a first connecting member, and a first fastening member;
one end of the supporting assembly is rotatably connected to the keyboard assembly, the other end of the supporting assembly is rotatably connected to the first connecting member, and the first connecting member is further slidably connected to the first fastening member, wherein the supporting assembly comprises: a support member and a second connecting member fixedly connected to the support member, wherein the second connecting member comprises a first connecting portion that is rotatably connected to the keyboard assembly, wherein the keyboard assembly comprises: a keyboard body and a third connecting portion connected to the keyboard body, a first mounting hole is disposed on the third connecting portion, and the first connecting portion comprises: a body portion and a first rotating shaft fixedly connected to the body portion, wherein the first rotating shaft is located in the first mounting hole, and the first rotating shaft and the first mounting hole rotatably match each other, wherein the first rotating shaft comprises: a first rotating shaft portion and a second rotating shaft portion fixedly connected to the first rotating shaft portion, wherein a diameter of the second rotating shaft portion is greater than a diameter of the first rotating shaft portion, and one end that is of the second rotating shaft portion and that is away from the first rotating shaft portion is fixedly connected to the body portion;
the first mounting hole comprises: a first sub-mounting hole and a second sub-mounting hole connected to the first sub-mounting hole; and
an inner diameter of the second sub-mounting hole is greater than an inner diameter of the first sub-mounting hole, the first rotating shaft portion matches the first sub-mounting hole, and the second rotating shaft portion matches the second sub-mounting hole; and
a surface that is of the first fastening member and that is away from the first connecting member is fixedly connected to an electronic device, and wherein the first fastening member is fixedly connected to the electronic device.

18. The electronic device assembly according to claim 17, wherein an opening is provided on a first part of the first fastening member, and the opening is opposite to a camera of the electronic device.

19. The electronic device assembly according to claim 17, wherein the first fastening member comprises: a first part and a second part fixedly connected to the first part;
a slider is disposed on one of the second part and the first connecting member, and a slide rail is disposed on the other of the second part and the first connecting member; and
the slider and the slide rail slidably match each other.

20. The electronic device assembly according to claim 17, wherein the keyboard assembly further comprises a fourth connecting portion;
the fourth connecting portion is located between the keyboard body and the third connecting portion, and the fourth connecting portion is fixedly connected to each of the keyboard body and the third connecting portion; and
an accommodating groove is disposed on the fourth connecting portion, a bottom end of the electronic device is located in the accommodating groove, and the bottom end of the electronic device and the accommodating groove rotatably match each other.

* * * * *